(12) United States Patent
Schott et al.

(10) Patent No.: US 6,773,199 B2
(45) Date of Patent: Aug. 10, 2004

(54) COUPLING, ESPECIALLY TORQUE LIMITING COUPLING

(75) Inventors: Wilhelm Schott, Köln (DE); Andreas Sarfert, Bonn (DE); John Zubik, Lockport, IL (US)

(73) Assignee: GKN Walterscheid GmbH (DE)

( * ) Notice: Subject to any disclaimer, the term of this patent is extended or adjusted under 35 U.S.C. 154(b) by 30 days.

(21) Appl. No.: 10/087,287

(22) Filed: Feb. 28, 2002

(65) Prior Publication Data

US 2003/0161681 A1 Aug. 28, 2003

(51) Int. Cl.[7] .................................................. F16B 7/04
(52) U.S. Cl. ..................... 403/359.1; 403/373; 403/362
(58) Field of Search ......................... 483/359.1–359.6, 483/362, 367, 368, 370, 373, 374; 464/160–162; 285/330, 404

(56) References Cited

U.S. PATENT DOCUMENTS

| 2,510,414 A | * | 6/1950 | Philbrick | 403/362 |
| 2,800,004 A | | 7/1957 | Schroter | 64/29 |
| 3,408,830 A | * | 11/1968 | Sutaruk et al. | 464/160 |
| 4,932,809 A | | 6/1990 | Kopp | 403/359 |
| 5,938,534 A | | 8/1999 | Kurian et al. | 464/162 |
| 5,980,388 A | | 11/1999 | Bolander | 464/160 |

FOREIGN PATENT DOCUMENTS

| EP | 0 870 945 | | 10/1998 | |
| GB | 284106 | * | 1/1928 | 464/160 |

* cited by examiner

*Primary Examiner*—Anthony Knight
*Assistant Examiner*—Michael P. Ferguson
(74) *Attorney, Agent, or Firm*—Harness, Dickey & Pierce, P.L.C.

(57) ABSTRACT

A coupling, especially a torque limiting coupling, has a coupling housing (2) and an inner coupling member (10) received therein. The inner coupling member (10) connects to a drive shaft. Torque transmitting elements (12), active in the form of locking members, are positioned between the inner coupling member (10) and the coupling housing (2). The coupling housing (2) has a connecting bore portion (6) which receives a connecting portion (19) of a connecting element (18). The outer contour (10) of the connecting portion (19) follows the inner contour (9) of the coupling housing (2) in the area of the connecting bore portion (6). The connecting portion (19) is accommodated with a radial clearance. Thus, radial displacements, circumferential displacements as well as angular displacements are possible between the coupling housing (2) and the connecting element (18).

4 Claims, 1 Drawing Sheet

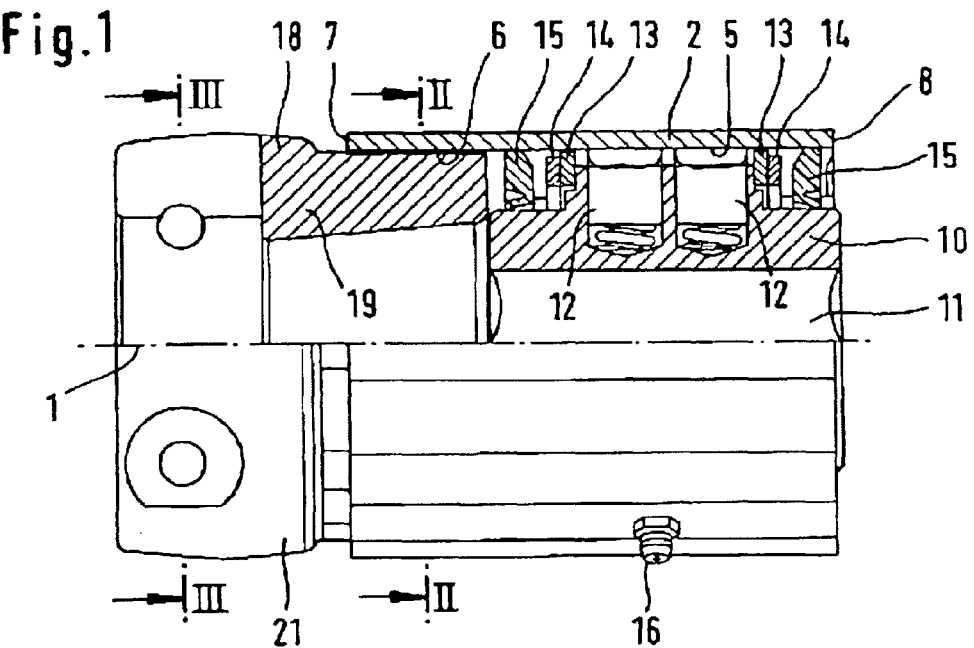
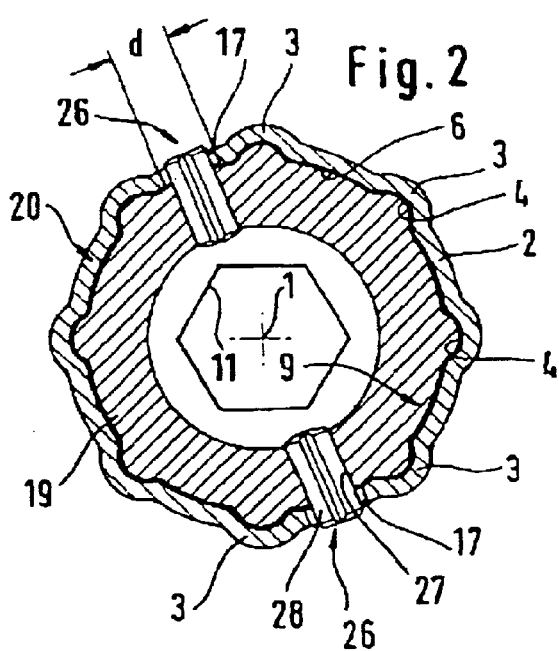
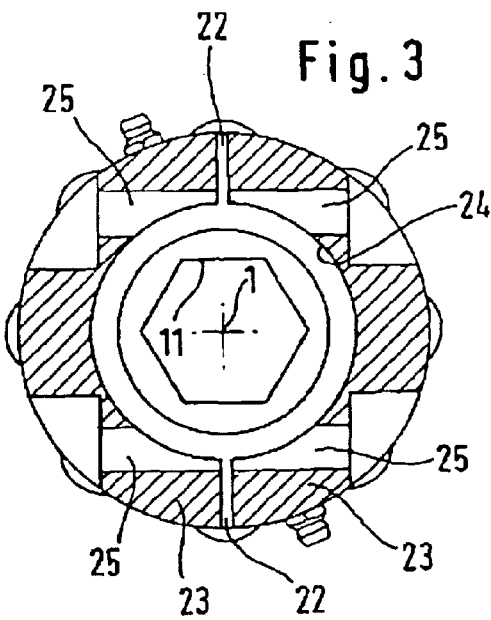
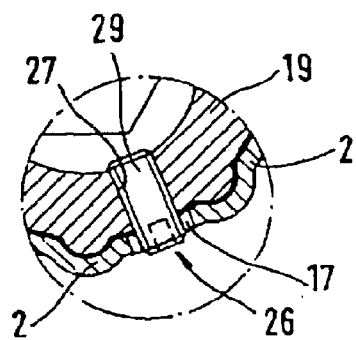

COUPLING, ESPECIALLY TORQUE LIMITING COUPLING

BACKGROUND OF THE INVENTION

The invention relates to couplings, especially torque limiting couplings. The invention relates to the connection between a coupling housing and a connecting element. The connecting element connects a driving or driven component of a machine or an aggregate.

Couplings, especially torque limiting couplings, which act as overload couplings, are generally used to drive agricultural implements or self-propelled working machines. The couplings secure individual driven aggregates or component groups, as well as individual working tools against overload. When several couplings are arranged in a drive, and act to transmit torque to the driven branched working tools, a problem arises due to the working widths and the flexibility of the machine frame and the common driving shaft, in that the response behaviour of the coupling is negatively influenced in the case of an overload. Accordingly, sometimes no repetition accuracy to switch off is given, as restraints arise.

SUMMARY OF THE INVENTION

The invention provides a coupling, especially a torque limiting coupling, which ensures, independent of the arrangement in the driveline, a secure response with the necessary repetitive accuracy.

According to the invention, a coupling, especially a torque limiting coupling, comprises a tubular coupling housing defining a longitudinal axis. Starting from a first axial end, the coupling housing has a connecting bore portion. In a cross-sectional plane crossing the longitudinal axis at a right angle, the connecting bore has a circumferential inner contour. The contour is non-circular. The coupling housing has an insertion bore portion. An inner coupling member is accommodated in the insertion bore portion of the coupling housing. The inner coupling member is coaxially surrounded by the coupling housing. Torque transmitting elements are positioned between the coupling housing and the inner coupling member. Also, the torque transmitting elements cause rotational torque transmission between the coupling housing and the inner coupling member. A connecting element, which has a connecting portion, is accommodated in the connecting bore portion of the coupling housing. The connecting portion has an outer contour, in a cross-sectional plane crossing the longitudinal axis at a right angle, that follows the inner contour of the coupling housing at a radial distance. Thus, a clearance is formed between the two. Connection means connects the coupling housing to the connecting element. Accordingly, both are movably held relative to each other in a limited way.

An advantage of this embodiment is that the inner coupling member may move together with the housing relative to the connecting element. Thus, inaccuracies concerning the position of the inner coupling member and the outer coupling housing relative to the connecting element, can be absorbed. Accordingly, angular movements and/or axial movements and/or radial movements may be carried out with respect to each other. Thus, restraints are prevented. Likewise, the response behaviour of the coupling stays uninfluenced.

In an embodiment of the invention, the connection means enables a limited angular movement and/or axial movement and/or radial movement. The amount of movement is adapted to the application case. Angular, radial or longitudinal movement between the connecting element and the inner coupling member is only achieved by the insertion of the connecting portion, with clearance, in relation to the inner contour of the connecting bore portion of the coupling housing.

Preferably, the connection means are arranged in an area of the connecting bore portion of the coupling housing and the connecting portion of the connecting element. The connection means includes at least one opening in the coupling housing. Also, per each opening, a pin or a screw is insertable into an insertion bore of the connecting element. A splined pin is preferably used as the pin. Preferably, a hexagon socket head screw is used as the screw. The movability of the coupling housing to the connecting element, or the reverse, is achieved by the pin or screw engaging, with a clearance, the corresponding opening in the coupling housing.

Furthermore, the coupling housing over its total axial length has rib-like projections extending parallel to the longitudinal axis. The rib-like projections form grooves in the inner contour of the coupling housing. In this embodiment, the connecting bore portion and the insertion bore portion of the coupling housing are formed the same considering the clearance between the two. This is economical. The outer contour of the connecting element is formed in the area of the connecting portion of the inner contour following the coupling housing with rib-like projections. Partially cylindrical faces are formed between the rib-like projections. However, a clearance is provided. The pins or the screws are preferably provided in the area of the partial cylindrical faces.

From the following detailed description, taken in conjunction with the accompanying drawings and subjoined claims, other objects and advantages of the present invention will become apparent to those skilled in the art.

BRIEF DESCRIPTION OF THE DRAWINGS

FIG. 1 is a longitudinal sectional view through a coupling according to the invention;

FIG. 2 is a sectional view of FIG. 1 along line II—II thereof with a first embodiment of the connection means between the coupling housing and the connecting element;

FIG. 3 is a sectional view of FIG. 1 along line III—III thereof; and

FIG. 4 is an enlarged cross-sectional view of an alternative embodiment of the connection means to those in FIG. 2.

DETAILED DESCRIPTION OF THE PREFERRED EMBODIMENTS

The coupling shown in the drawings has a coupling housing 2 centred on the longitudinal axis 1. Projections 3 extend parallel to the longitudinal axis 1. The projections 3 form rib-like projections on the outer side of the coupling housing 2. When the coupling housing 2 is tubular with approximately constant wall thickness, grooves 4 are formed in the area of the projections 3 on the inner contour 9. The grooves 4 alternate with partial cylindrical faces around the longitudinal axis 1 in the circumferential direction.

The coupling housing 2 has a first axial end 7 and a second axial end 8. The inner contour 9 of the coupling housing 2, starting from the first axial end 7, acts as a connecting bore portion 6. The inner contour 9, from the connecting bore portion 6 to the second axial end 8, acts as an insertion bore portion 5.

An inner coupling member 10 is supported by its outer face in the insertion bore portion 5. The inner coupling member 10 has a central connecting bore 11. The connecting bore 11 is centred on the longitudinal axis 1. Radial bores are formed in the inner coupling member 10. Torque transmitting elements 12, in the form of locking members, are arranged in the radial bores. The torque transmitting elements 12 are urged by a spring to a position projecting beyond the outer face of the inner coupling member 10. The torque transmitting elements 12 engage, with their heads, in a torque transmission position, the grooves 4 of the coupling housing 2.

The inner coupling member 10 is held in the axial direction by two abutment discs 13 and retaining rings 14. The retaining rings 14 engage corresponding grooves in the coupling housing 2. Sealing rings 15 are provided to seal, to the outside, the portion in which the torque transmitting elements 12 are arranged. A lubrication nipple 16 in the coupling housing 2 enables lubrication.

A connecting element 18, with its connecting portion 19, is received in the connecting bore portion 6 starting from the first axial end 7. The connecting portion 19 has an outer contour 20. The outer contour 20, in cross-section, follows the inner contour 9 of the coupling housing 2 in the area of the connecting bore portion 6. The outer contour 20 differs from the form of a circle. The connecting portion 19 includes distributed rib-like projections that engage with the grooves 4. Partial cylindrical faces are provided between the projections 5. The outer contour 20 does not dimensionally correspond to the inner contour 9. The outer contour 20 is formed smaller than the inner contour 9 by a specific amount. Thus, the connecting element 18, with its connecting portion 19, in the connecting bore portion 6 of the coupling housing 2, with reference to the coupling housing 2 mounted on the longitudinal axis 1, may carry out radial and angular movements. Additionally, the connecting element 18 may also move axially.

The connecting portion 19 is connected to a clamping portion 21. The clamping portion has two jaws 23, which are separated from each other by slots 22. The two clamping portion jaws 23 form a cylindrical clamping bore 24. The clamping portion 21 also has a longitudinal bore. A shaft can pass through the longitudinal bore and be inserted into the connecting bore 11 of the coupling inner member 10. The jaws 23 include screw bores 25 which receive screws (not shown). The screws clamp the two jaws 23 against each other when the clamping portion 21 is attached to a tube. The tube acts as an input shaft for a gear box. Instead of a cylindrical clamping bore 28, a profiled bore may be provided.

A connection means 26 is provided between the coupling housing 2 and the connecting portion 19 of the connecting element 18. Openings 17 are arranged at diametric positions in the area of the connecting bore portion 6 of the coupling housing 2. The openings 17 are formed as bores with a diameter d. The diameter d of these openings 17 is larger than the outer diameter of the pins 28 provided in the embodiment of FIG. 2. The pins 28 are in the form of splined pins. The pins 28 are inserted into correspondingly arranged insertion bores 27 of the connecting portion 19 of the connecting element 18. Axial, angular, radial or circumferential movement is possible due to the clearance between the outer contour 20 of the connecting element 18 and the inner contour 9 of the coupling housing 2 in the area of the connecting bore portion 6 and due to the dimensions of the outer diameter of the pins 28 in relation to the openings 17. Thus, positional deviations between the connecting bore 11 and the clamping portion 21 can be absorbed.

In FIG. 4 a modified embodiment of the connection means 26 is shown. Openings 17 in the area of the coupling housing 2 are still present, however, instead of the pins 28 hexagon socket head screws 29 are provided. In this case instead of cylindrical bores the insertion bores 28 are formed as threaded bores. Also, clearance is present between the screws 29 and the openings 17.

While the above detailed description describes the preferred embodiment of the present invention, the invention is susceptible to modification, variation and alteration without deviating from the scope and fair meanings of the subjoined claims.

What is claimed is:

1. A torque limiting coupling, comprising:
   a longitudinal axis;
   a tubular coupling housing having a connecting bore portion starting from a first axial end, said connecting bore portion in a cross-sectional plane crossing the longitudinal axis at a right angle, having a circumferential inner contour which is non-circular, and said coupling housing having an insertion bore portion:
   an inner coupling member accommodated in the insertion bore portion of the coupling housing, said inner coupling member coaxially surrounded by the coupling housing;
   torque transmitting elements between said inner coupling member and said coupling housing causing a rotational torque transmission between the coupling housing and the inner coupling member;
   a connecting element including a connecting portion, said connecting portion accommodated in the connecting bore portion of the coupling housing adjacent said first axial end, said connecting portion including an outer contour, in cross-section, which follows the inner contour of the coupling housing at a radial distance, such that a clearance exists between the inner and outer contours; and
   connection means for connecting the coupling housing to the connecting element wherein said coupling housing and said connecting elements are movably held relative to each other in a limited way, the connection means are arranged in an area of the connecting bore portion of the coupling housing and the connecting portion of the connecting element and comprise at least one opening in the coupling housing and per each opening comprise a pin or a screw insertable into an insertion bore of the connecting element.

2. The coupling according to claim 1, wherein the connection means enable a limited angular movement, axial movement or radial movement or a combination of said movements.

3. The coupling according to claim 1, wherein the pin or screw engage the opening with a clearance.

4. The coupling according to claim 1, wherein the coupling housing over its total axial length has rib-like projections extending parallel to the longitudinal axis, said rib-like projections forming grooves in the inner contour of the coupling housing.

* * * * *